July 14, 1970    JEAN-HENRI DUFOUR    3,520,204
LINK BELT FOR MECHANICAL TRANSMISSION Filed Oct. 29, 1968    2 Sheets-Sheet 1

United States Patent Office 3,520,204
Patented July 14, 1970

3,520,204
LINK BELT FOR MECHANICAL TRANSMISSION
Jean-Henri Dufour, Villeurbanne, France, assignor to
Ste. Ame P.I.V., Villeurbanne, France
Filed Oct. 29, 1968, Ser. No. 771,418
Claims priority, application France, Oct. 31, 1967,
49,275
Int. Cl. F16g 1/24
U.S. Cl. 74—236                                          1 Claim

ABSTRACT OF THE DISCLOSURE

A link belt is made of a central armature constituted for each link by S-shaped metallic blades positioned symmetrically one against the other in such a way that two of their ends be juxtaposed and that the other two ends be parallel and spaced apart to receive between them the extremities of the armature of the next link. Cheeks of elastic material are secured to the sides of each armature, each cheek being provided with a tapered bore for permitting the insertion of a shaft for pivotally joining the links. The bores are disposed with their smaller diameter ends adjacent the armature to provide an interfering step for preventing the shaft from undesired removal.

---

Metallic chains used in mechanical transmissions and in particular in speed changes with conical pulleys allow for the transmission of considerable power but have certain drawbacks the most important of which are:

The necessity of a complicated structure to make possible the lateral adherence on the cheeks of the pulleys.

No noise during operation and splash lubrication requiring regular filling of the transmission housing.

To avoid these, it would be possible to replace the chain by a belt, but in fact this latter also has drawbacks and in particular does not permit the transmission of high power, the obtaining of considerable speed changes, bearing in mind the small winding diameter of this belt and requires at least partial disassembly of the speed changer for replacement.

The present invention is concerned with improvements in chains used for mechanical transmission which aim at eliminating the drawbacks which are inherent in chains and in belts while still retaining the advantages of the latter.

According to this improvement, there is provided a link belt comprising:

A central armature constituted, for each link, by at least one metal part pivoted at each end on a metallic shaft passing the corresponding ends of the parts of the links which precede it and follow it, and Cheeks of elastic material, which are relatively supple, recessed laterally on either side of each part constituting the previously mentioned armature and coming in turn in contact with the smooth striated or knurled cheeks of the receiving and driving pulleys.

Such a link belt therefore can transmit considerable force owing to its central armature and this without noise or sliding owing to the cheeks of elastic material.

According to a preferred embodiment of the invention, the central armature of each link is constituted by two S-shaped metallic blades positioned symmetrically one against the other in such a way that two of their ends be juxtaposed and the other two be parallel and spaced apart to receive therebetween the recessed ends of the armature of the next link.

In addition, cheeks of elastic material such as rubber or plastic material, are recessed each by gluing and/or vulcanizing on the outer lateral side of the end forming the half yoke of each element of the central armature.

To facilitate the insertion and removal of any of the shafts linking each link of the chain, each elastic cheek comprises, in the extension of the bores provided for the elements of the armature, a truncated conical bore the smallest diameter of which issues on the face thereof which contacts the armature to form a step preventing all unwanted departure of the shaft but making possible its insertion in the previously mentioned bores.

In any way the invention will be better understood with the aid of the following description reference being made to the schematic drawing accompanying the same representing by way of non limiting example several embodiments of this link belt.

Figure 1:
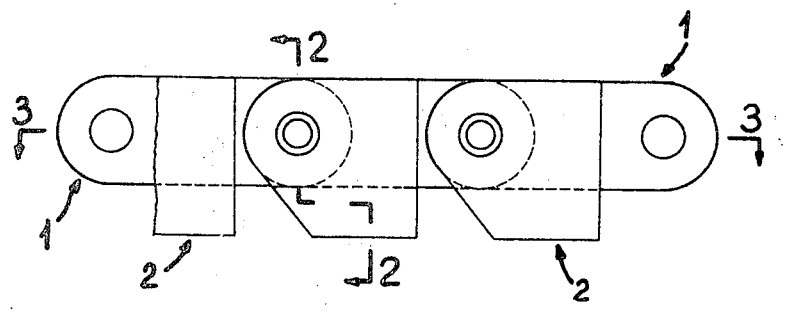

FIG. 1 is a side elevational view of a first embodiment of this link belt.

Figure 2:
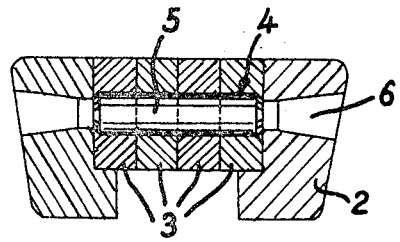
Figure 3:
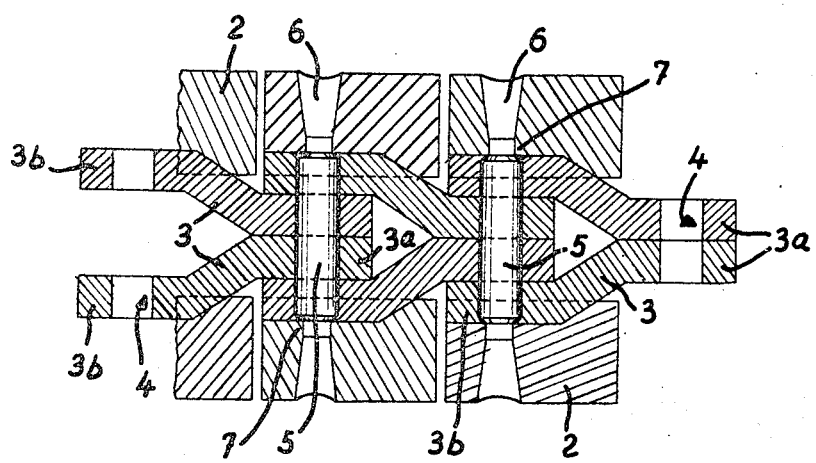

FIGS. 2 and 3 are cross sectional views taken respectively along lines 2—2 and 3—3 of FIG. 1.

Figure 4:
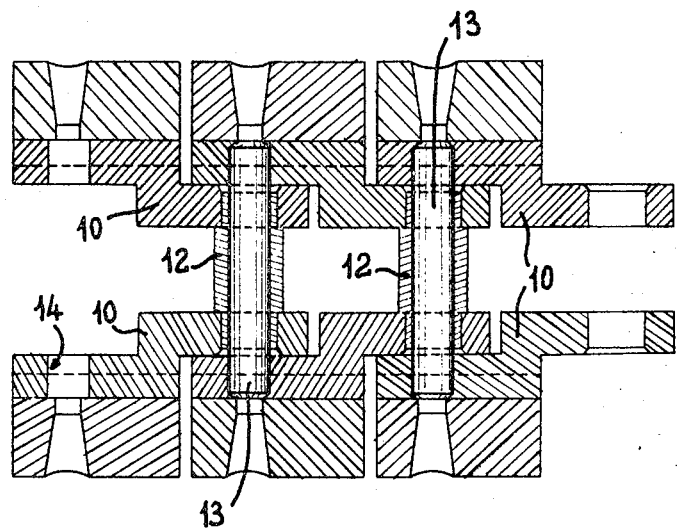
Figure 5:
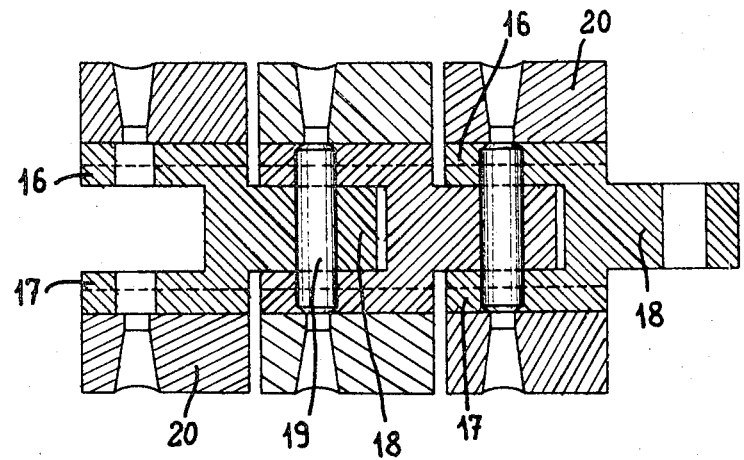

FIGS. 4 and 5 are transversal cross sectional views similar to FIG. 3 and showing two other embodiments of this link belt.

According to the invention this link belt is essentially constituted by a metallic armature 1 on which are laterally recessed cheeks 2 made of relatively supple rubber.

According to a first embodiment of the invention, the central armature is constituted by steel blades 3, folded to an S shape and assembled in such a way that two of their extremities, such as 3a in FIG. 3, be juxtaposed while their other extremities 3b be sufficiently spaced from one another to form a yoke intended to receive the juxtaposed extremities of the preceding blades.

Each blade 3 has at each of its two extremities a bore 4 which receives a metallic shaft 5 connecting between two consecutive links.

On the outer sides of the yoke formed at one of the extremities of each link are glued and vulcanized cheeks 2 made of rubber.

Each of these cheeks 2 has a tapered bore 6, shown in the drawings as a truncated conical bore, the axis of which lies in the extension of that of bore 4 of each link pivot. The smallest diameter of this truncated bore 6, which has a diameter less than that of pin or shaft 5, is disposed on the side of the cheek which contacts the metallic armature as shown in FIGS. 2 and 3 to form in this manner a step 7 which prevents all translational movement of shaft 5.

Such a link belt can be provided with cheeks 2 with a sloping outer side or with cheeks with parallel sides according as to whether it is to be used with pulleys which have straight or conical flanges.

This link belt has various advantages relative to the present chains and belts. Thus just like chains it can transmit considerable power and makes it possible to use small winding diameters and can be assembled and disassembled very rapidly on any speed changer without it being necessary to disassemble even partially this changer.

It also has the advantages of a belt which are in particular adherence, noiseless operation and elimination of maintenance.

In effect thanks to this link belt the cheeks 2 of which ensure transmission of movement by meshing in turn with the flanges of the driving pulley and of the receiver pulley, it is not necessary to provide for continuous lubrication as is the case with chains with blades currently used in speed changers.

The flanges against which bear cheeks 2 of this link belt can either be smooth, striated, channelled or knurled according to the power to be transmitted.

According to a modification shown in FIG. 4, the central armature is constituted for each link by two plates 10 the extremities of which are located in different planes. These plates 10 positioned symmetrically are connected two by two through a hollow sleeve 12 with shoulders at their extremities passing through the bores provided in parts 10 and crushed therein to ensure the immobilization in translational movement of each plate. As in the previous embodiment, the assembly of two consecutive links is ensured by a shaft or pin 13 engaged in bores 14 in the remote extremities of the link and in the inner bore of sleeve 12.

Cheeks of elastic material are added by gluing and vulcanizing on the outer side of the yoke formed by the two remote extremities of plates 10.

FIG. 5 shows another embodiment of this link belt in which the central metallic armature is constituted by a single part comprising two branches 16 and 17 forming a chape or yoke and a tail 18 intended to engage in the yoke of the following part. The connection between two consecutive parts is also ensured by a shaft 19 positioned in bores provided at each end of each part and translationally immobilized by elastic material cheeks 20.

The invention is not limited to the embodiments shown above by way of nonlimiting examples and on the contrary encompasses all other modifications.

I claim:
1. A link belt for mechanical transmission, each link comprising:
   a central armature formed by at least one metallic element pivoted at each extremity on a metallic shaft passing through corresponding extremities of preceding and following links, and
   cheeks of elastic material secured on either side of each said armature, each cheek being provided with a tapered bore issuing on the face thereof in contact with said armature to form a step preventing all undesired departure of said shaft but permitting the introduction of the shaft to said armature through said cheeks.

References Cited
UNITED STATES PATENTS

| | | | |
|---|---|---|---|
| 779,253 | 1/1905 | Bayliss | 74—236 |
| 921,095 | 5/1909 | Dukelow | 74—236 |
| 1,424,768 | 8/1922 | Mesinger | 74—236 |
| 2,054,339 | 9/1936 | Reeves | 74—236 |
| 2,309,648 | 2/1943 | Kelly | 74—236 |
| 2,403,607 | 7/1946 | Ogard | 74—236 |

JAMES A. WONG, Primary Examiner